US009261665B2

(12) United States Patent
Fukumoto et al.

(10) Patent No.: US 9,261,665 B2
(45) Date of Patent: Feb. 16, 2016

(54) LOCKING DEVISE FOR OPTICAL DROP CABLE (71) Applicant: SEIWA ELECTRIC MFG. CO., LTD., Joyo (JP)

(72) Inventors: Misa Fukumoto, Joyo (JP); Akira Kuto, Joyo (JP)

(73) Assignee: Seiwa Electric MFG. Co., Ltd., Joyo (JP)

( * ) Notice: Subject to any disclaimer, the term of this patent is extended or adjusted under 35 U.S.C. 154(b) by 115 days.

(21) Appl. No.: 14/350,421

(22) PCT Filed: Aug. 9, 2013

(86) PCT No.: PCT/JP2013/071717
§ 371 (c)(1),
(2) Date: Apr. 8, 2014

(87) PCT Pub. No.: WO2015/019503
PCT Pub. Date: Feb. 12, 2015

(65) Prior Publication Data
US 2015/0219868 A1 Aug. 6, 2015

(51) Int. Cl.
G02B 6/44 (2006.01)
G02B 6/00 (2006.01)

(52) U.S. Cl.
CPC .......... *G02B 6/4439* (2013.01); *G02B 6/4471* (2013.01); *G02B 6/4494* (2013.01); *G02B 6/4428* (2013.01); *G02B 6/4444* (2013.01)

(58) Field of Classification Search
CPC .. G02B 6/4444; G02B 6/4472; G02B 6/4494; G02B 6/4428; G02B 6/4439; G02B 6/4471
See application file for complete search history.

(56) References Cited

U.S. PATENT DOCUMENTS

| 5,943,462 A * | 8/1999 | Schofield ............. G02B 6/3887 385/100 |
| 7,097,486 B2 * | 8/2006 | Parsons .............. H01R 13/5202 439/291 |
| 8,483,537 B2 * | 7/2013 | Zeng .................... G02B 6/4472 385/137 |

(Continued)

FOREIGN PATENT DOCUMENTS

| JP | 09-243832 A | 9/1997 |
| JP | 2001-337255 A | 12/2001 |

(Continued)

OTHER PUBLICATIONS

International Search Report dated Sep. 3, 2013, issued for PCT/JP2013/071717.

*Primary Examiner* — Rhonda Peace
(74) *Attorney, Agent, or Firm* — Locke Lord LLP; James E. Armstrong, IV (57) ABSTRACT

A locking device for optical drop cable 100 comprising a cable conductor optical fiber 210, tension members 220 sandwiching the cable conductor optical fiber 210, a sheath 230 having a notched portion 250 covering the cable conductor optical fiber 210 and the tension members 220, a rubber sleeve 20 of the shape constituting a part of the conical wherein several through-holes 26 corresponding to an outline of the sheath 230 are formed along a shaft center, and a slit portion 18 and a tapered portion 34 configured to squeeze the rubber sleeve 20 toward the shaft center direction in a state where a optical drop cable 200 is passed through the through-hole 26, is provided to easily realize waterproofing measures for the optical drop cable of a peculiar shape.

4 Claims, 5 Drawing Sheets

(56) References Cited

U.S. PATENT DOCUMENTS

| | | | |
|---|---|---|---|
| 2006/0172578 A1* | 8/2006 | Parsons | H01R 13/5202 439/291 |
| 2011/0033157 A1 | 2/2011 | Drouard | |
| 2011/0075983 A1 | 3/2011 | Fan et al. | |
| 2013/0014974 A1* | 1/2013 | Burke | H02G 15/013 174/135 |
| 2015/0219868 A1* | 8/2015 | Fukumoto | G02B 6/4472 385/134 |

FOREIGN PATENT DOCUMENTS

| | | |
|---|---|---|
| JP | 2002-348424 A | 12/2002 |
| JP | 2010-250011 A | 11/2010 |
| JP | 2011-517274 A | 5/2011 |
| JP | 2011-525695 A | 9/2011 |
| WO | WO-2009/126411 A1 | 10/2009 |
| WO | WO-2010/008718 A2 | 1/2010 |

* cited by examiner

LOCKING DEVISE FOR OPTICAL DROP CABLE

FIELD OF THE INVENTION

The present inventions is related to a locking device for optical drop cable, particularly, a locking device for optical drop cable that waterproofing measures have been applied.

BACKGROUND OF THE INVENTION

Conventionally, as disclosed in Patent Document 1, tension members are located above and below a cable conductor of the optical fiber, a support wire is located on the above tension member, and there is an optical drop cable forming a resin coating layer by the extrusion coating these support wire, the tension members and the cable conductor of the optical fiber using the resin composition.

When receiving the optical drop cable from outdoors to indoors, the optical drop cable and an indoor cable are connected by using an optical connector at an optical cabinet installed on an indoor or outer wall surface of a housing.

Herein, at the connection of the optical cabinet and the optical drop cable, a thing named as a locking device for optical drop cable is provided. When the optical cabinet is installed on the outer wall surface, it is necessary to apply waterproofing measures at around the connection portion of the locking device for optical drop cable.

Patent Document 1: JPA2010-250011

DISCLOSURE OF THE INVENTION

Problem to be Solved by the Invention

However, the optical drop cable described in Patent Document 1 has a peculiar shape. For this reason, in the case of using existing locking device for optical drop cable, space is generated in connection with the locking device for optical drop cable and the optical drop cable. The applying waterproofing measures so as to close the space is troublesome.

Accordingly, the present invention makes it a problem to provide the locking device for optical drop cable which is possible to easily realize waterproofing measures for the optical drop cable of a peculiar shape.

Means of Solving the Problems

In order to solve the above problem, the present invention relates to a locking device for optical drop cable comprising, a cable conductor of optical fiber, tension members sandwiching the cable conductor of optical fiber, a sheath having a notched portion covering the cable conductor of optical fiber and the tension members, a rubber sleeve of the shape constituting a part of the conical, and several through-holes corresponding to an outline of the sheath are formed along a shaft center, and a member constituted to squeeze the rubber sleeve toward the shaft center direction in a state where a optical drop cable is passed through the through-hole.

The through-hole is shaped approximately 8, in the case where the multiple through-holes are formed, they are formed by aligning the same direction to each other.

The rubber sleeve is the shape constituting a part of the conical, and the member comprises a slit portion surrounding the side surface of the rubber sleeve and grips the rubber sleeve to squeeze the slit portion toward the shaft center direction.

It is preferable that a hardness of the rubber sleeve is in the range of 40 to 50 degrees.

In addition, the present invention is the rubber sleeve used for the locking device for optical drop cable mentioned above, wherein the rubber sleeve has the shape constituting a part of the conical, in which several through-holes corresponding to an outline of the sheath are formed along a shaft center, and the rubber sleeve is configured to squeeze toward the shaft center direction in a state where an optical drop cable is passed through the through-hole by the member in the locking device for optical drop cable.

BRIEF DESCRIPTION OF THE DRAWINGS

FIG. 4 shows a front view, a plan view and a bottom view of the rubber sleeve 20 where the optical drop cable 200 shown in FIG. 3 is passed through.

DESCRIPTION OF SYMBOLS

10 Bolt portion
20 Rubber sleeve
22 First surface
24 Second surface
26 Through-hole
30 Cap
40 Rubber packing
50 Lock nut
210 Cable conductor of optical fiber
220 Tension member
230 Sheath
240 Support wire
250 Notched portion

EMBODIMENT OF THE INVENTION

Referring to drawings, embodiments according to the present invention are described hereinafter.

Embodiment 1

Figure 1:
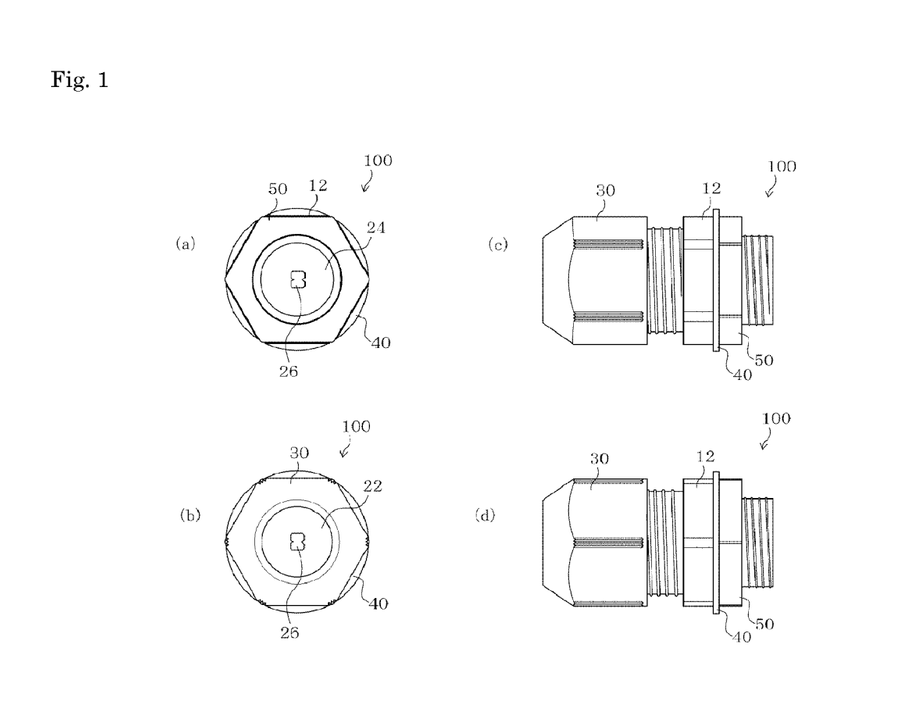
FIG. 1 shows a front view, a rear view, a plan view, a bottom view, and left and right side views of the locking device for optical drop cable 100 of Embodiment 1 of the present invention.

FIG. 1 shows a front view (FIG. 1 (*a*)), a rear view (FIG. 1 (*b*)), a plan view and a bottom view (FIG. 1(*c*)), and left and right side views (FIG. 1(*d*)) of the locking device for optical drop cable 100 of Embodiment 1 of the present invention.

Figure 2:
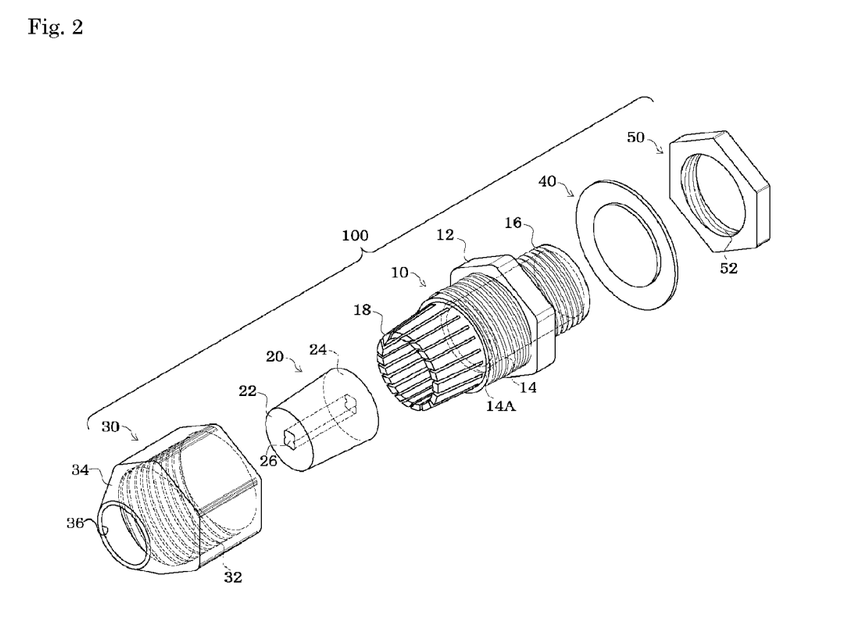
FIG. 2 shows an exploded perspective view of the locking device for optical drop cable 100 shown in FIG. 1 (*a*)-FIG. 1 (*d*).

FIG. 2 shows an exploded perspective view of the locking device for optical drop cable 100 shown in FIG. 1 (a)-FIG. 1 (d). FIG. 1 and FIG. 2 show a bolt portion 10, a rubber sleeve 20, a cap 30, a rubber packing 40, and a lock nut 50 described below.

In addition, although it is not a thing limited to these, the bolt portion 10 and the cap 30 can be made of plastic such as polyamide, the lock nut 50 can be made of plastic such as polyamide or metal, and the rubber sleeve 20 and the rubber packing 40 can be made of rubber such as chloroprene rubber, nitrile rubber, butyl rubber.

The bolt portion 10 has a hollow structure formed the space corresponding to the shape of the rubber sleeve 20. In the center against the longitudinal direction of the bolt portion 10, a receiving portion 12 of the hexagonal shape receiving such as a spanner at the time of tightening is located. At the both ends of the receiving portion 12, shaft portions 14, 16 where a male thread is cut are located. The shaft portion 16 is screwed with a lock nut 50 in a state the rubber packing 40 is inserted and in a state being inserted in an opening portion provided in the optical cabinet which is the attachment object of the locking device for optical drop cable 100.

On the other hand, the shaft portion 14 is screwed with the cap 30 in a state where the rubber sleeve 20 is inserted. On the inner wall of the shaft portion 14, a step portion 14A is formed and its inside diameter is smaller than the diameter of the bottom surface of the rubber sleeve 20, for the positioning of the rubber sleeve 20 against the longitudinal direction of the bolt portion 10. The tip of the shaft portion 14 has multiple slits, and a slit portion 18 surrounding the sides of the rubber sleeve 20 is located at the time of use. Each of the slits constituting the slit portion 18 is formed at an angle of approximately 45° against the radial direction of the bolt portion 10. By screwing of the bolt 10 and the cap 30, the slit portion 18 is squeezed toward the shaft center, accordingly, the gripping of the rubber sleeve 20 is achieved.

As described below, the outline of the rubber sleeve 20 constitutes a part of the conical, and the rubber sleeve 20 comprises a first surface 22 which is a relatively small circular area, a second surface 24 which is a relatively large circular area, and a through-hole 26 which penetrates through the second surface 24 from the first surface 22 along the shaft center of the rubber sleeve 20 and grips the optical drop cable.

A cap 30 is configured similarly to a so-called hexagonal nut, and has a female screw portion 32 screwed with the shaft portion 14 of the bolt portion 10 and an opening portion 36 in which the optical drop cable is passed. In addition, a tapered portion 34 is formed adjacent to the opening portion 36. As described above, the tapered portion 34 has a function which squeezes the slit portion 18 of the bolt portion 10 toward its shaft center.

The rubber packing 40 is used to ensure the sealing property between the locking device for optical drop cable 100 and the optical cabinet (not shown). In addition, instead of providing the rubber packing 40 itself separately, it is also possible to ensure the above sealing property by affixing such as a rubber on the surface of the shaft portion 16-side at the receiving portion 12 of the bolt portion 10.

The lock nut 50 is for attaching the locking device for optical drop cable 100 to the optical cabinet (not shown) with the bolt portion 10, a female screw portion 52 screwed to the shaft portion 16 is formed on the inner wall.

Figure 3:
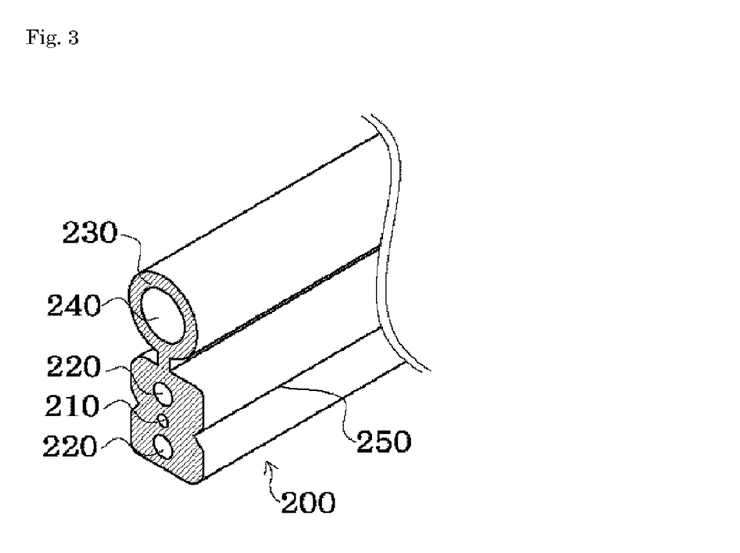
FIG. 3 shows a schematic configuration diagram of an optical drop cable 200 which is passed through in the rubber sleeve 20 shown in FIG. 2.

FIG. 3 shows a schematic configuration diagram of an optical drop cable 200 which is passed through in the rubber sleeve 20 shown in FIG. 2. As be known, a optical drop cable 200 shown in FIG. 3 comprises a cable conductor of a optical fiber 210, tension members 220 positioned on both sides of the cable conductor of the optical fiber 210, a support wire 240 provided adjacent to the tension member 220, and a sheath (resin coating layer) 230 covering them, and a notched portion 250 is formed in the sheath 230.

As shown in FIG. 3, the outline of the portion excluding the support wire 240, namely, the outline of the cable conductor of the optical fiber 210 and the tension members 220, as well as the sheath 230 which is covering them has a shape of 8 by the notch portion 250 being formed.

Figure 4:
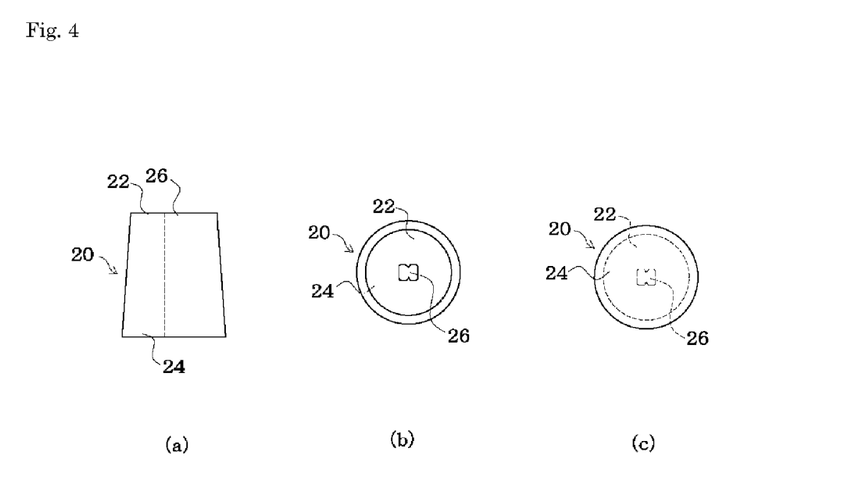

FIG. 4 shows a front view (FIG. 4 (a)), a plan view (FIG. 4 (b)) and a bottom view (FIG. 4 (c)) of the rubber sleeve 20 where the optical drop cable 200 shown in FIG. 3 is passed through.

As shown in FIG. 4 (a), the outline of the rubber sleeve 20 constitutes a part of the conical. In addition, as shown in FIG. 4 (b) and FIG. 4 (c), the first surface 22 and the second surface 24 have a circular shape together. Further, as shown in FIG. 4 (a) and FIG. 4 (b), as compared with the second surface 24, the first surface 22 is relatively small area and the through-hole 26 is formed toward the second surface 24 from the first surface 22.

In the through-hole 26, the portion excluding the support wire 240 among the optical drop cable 200 is passed through. The shape of the through-hole 26 is in the shape of approximately 8 corresponding to the outline of the optical drop cable 200.

Herein, the rubber sleeve 20 is in a condition to ensure the sealing property between the optical drop cable 200. In particular, the hardness of the rubber sleeve 20 in JIS K 6253 is adjusted to be approximately 40 to 50 degrees (for example, around 45 degrees). If it is under such hardness, during gripping the optical drop cable 200, there is no possibility that the optical drop cable 200 is damaged by being hard or the sealing property is not ensured by being soft.

In addition, the size of the through-hole 26 is determined in consideration of convenience of handleability for inserting the optical drop cable 200 as well as a condition to ensure the sealing property between the rubber sleeve 20 and the optical drop cable 200. With respect to the optical drop cable 200, the size of portion excluding the support wire 240 is mostly approximately 3.2 mm×2.0 mm. Hence, with respect to the size of the through-hole 26, the size having a clearance of approximately 0 mm-0.3 mm against the above dimensions is adopted.

Using the rubber sleeve 20 as a condition like this, by the action of the slit portion 18 in the bolt portion 10 and the tapered portion 34 in the cap 30, the rubber sleeve 20 accommodated in the bolt portion 10 is tightened, when gripping the rubber sleeve 20, it is possible to ensure the sealing property between them.

Figure 5:
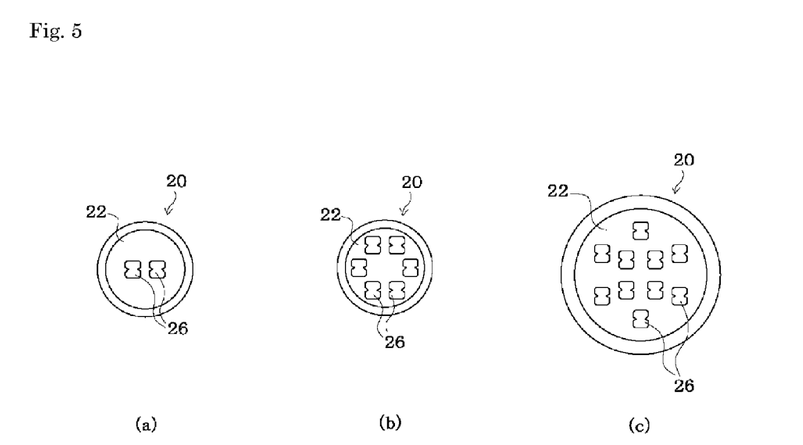
FIG. 5 shows a schematic configuration diagram of the rubber sleeve 20 of the other embodiment of the present invention.

FIG. 5 (a)-FIG. 5 (c) show schematic configuration diagrams of the rubber sleeve 20 of the other embodiment of the present invention, they are corresponding to FIG. 4 (b) respectively. It shows the state that the two through-holes 26 are formed in FIG. 5 (a), the six through-holes 26 are formed in FIG. 5 (b) and the ten through-holes 26 are formed in FIG. 5 (c). For the locking device for optical drop cable 100 of the present embodiment, it may be possible to use the rubber sleeve 20 which is formed the multiple through-holes 26 as shown in FIG. 5 (a)-FIG. 5 (c).

In particular, in the collective housing such as condominiums, it may become that the multiple optical drop cables 200 are required. Therefore, in order to correspond to the multiple optical drop cables 200, it is possible to use a rubber sleeve 20 which is formed with the through-holes 26 corresponding in number to the size of the collective housing in the locking device for optical drop cable 100.

In addition, in the case that some of the through-holes 26 are not used, in order to ensure the waterproof property, at the time of the use, it is preferable to insert the plug of the shape of approximately 8 which is the same as the shape of the optical drop cable 200 against the through-holes 26 which does not pass the optical drop cable 200.

Herein, the rubber sleeves 20 shown in FIG. 5 (a)-FIG. 5 (c) are formed by aligning the all directions of the through-holes 26 in the same direction. Because there is a direction in which the optical drop cable 200 is easy to be bent due to its shape, if the directions of the through-holes 26 are not kept align, the incorporating of the multiple optical drop cables 200 becomes difficult. On the other hand, the situation that a negative effect such that the cable conductor of the optical fiber 210 is broken may occur is taken into account, if the optical drop cable 200 is bent in the direction that is hard to bend by force. Therefore, as shown in FIG. 5 (a)-FIG. 5 (c), it is important that the through-holes 26 of the rubber sleeve 20 are formed by aligning in the same direction.

Figure 6:
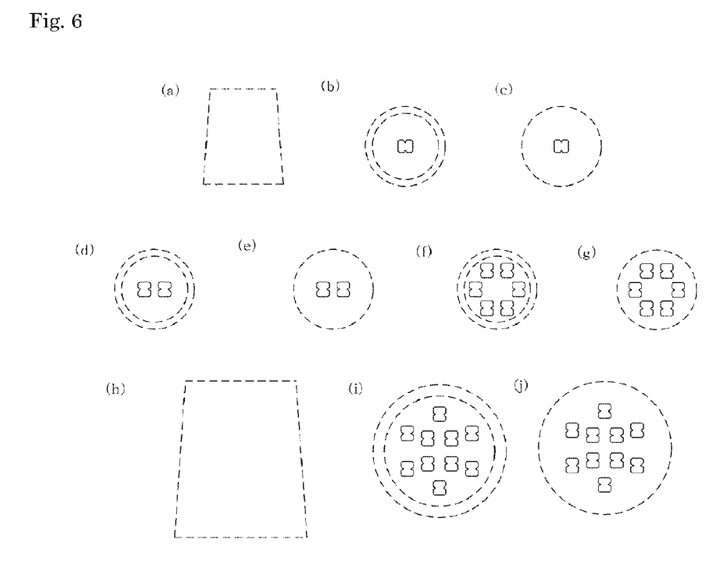
FIG. 6 shows a schematic configuration diagram of the rubber sleeve 20 of the other embodiment of the present invention.

FIG. 6 is a figure similar to the rubber sleeve 20 shown in such as FIG. 4 and FIG. 5. FIG. 6 (a)-FIG. 6 (c) correspond to FIG. 4 (a)-FIG. 4 (c), FIG. 6 (d)-FIG. 6 (e) correspond to FIG. 5 (a), FIG. 6 (f)-FIG. 6 (g) correspond to FIG. 5 (b) and FIG. 6 (h)-FIG. 6 (j) correspond to FIG. 5 (c). In addition, against the front view shown in FIG. 6 (a) and FIG. 6 (h), these left and right side views and rear view are the same.

The locking devices for optical drop cable 100 of the present embodiment produced by the various conditions described above are able to achieve IP66 as the International Protection code and 50 N as the clamping force of the optical drop cable 200.

In the present embodiment, although the locking device for optical drop cable 100 that targets the optical drop cable 200 is described, the term of the optical drop cable in the present specification includes the indoor cable, because it can also be used for the indoor cable. In addition, although approximately 2 mm×3 mm is common as the outline of the indoor cable, approximately 2 mm×2 mm is minimum according to the investigation by the applicant.

In the case of using the indoor cable of a general size, the clamping force also is able to achieve 50 N. And, in the case of using the indoor cable of a minimum size, the clamping force is able to achieve 30 N.

Embodiment 2

Figure 7:
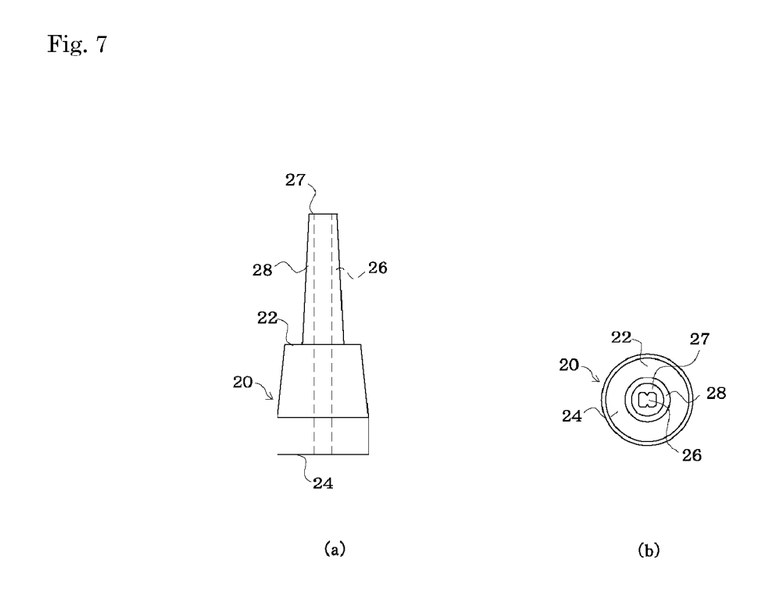
FIG. 7 shows a side view and a plan view of the rubber sleeve of Embodiment 2 of the present invention.

FIG. 7 shows a side view (FIG. 7 (a)) and a plan view (FIG. 7 (b)) of the rubber sleeve of Embodiment 2 of the present invention. The rubber sleeve 20 shown in FIG. 7 are enhanced the airtightness more compared to those of Embodiment 1.

The rubber sleeve 20 comprises a first portion constituting between the first surface 22 and the second surface 24, and a second portion constituting between the first surface 22 and the third surface 27. The first portion and the second portion are formed integrally.

The first portion includes the cylindrical surface which is parallel to its shaft center and the surface which constitutes a part of the conical same as Embodiment 1. The second portion constitutes a part of the conical to the third surface 27 from the first surface 22. In addition, the through-hole 26 is formed in a manner passing through the shaft center of the first portion and the second portion.

The hardness of the rubber sleeve 20 is same as Embodiment 1 and is adjusted to be approximately 40 to 50 degrees (for example, around 45 degrees). In addition, with respect to the size of the through-hole 26, the size having a clearance of approximately 0 mm-0.3 mm against the size of portion excluding the support wire 240 of the optical drop cable 200 is adopted.

The rubber sleeve 20 is inserted into the shaft portion 14, then, the cap 30 is screwed against the shaft portion 14, as a result, the second portion is projected from the opening portion 36 of the cap 30. And, for example, when the locking device for optical drop cable 100 is used in such as high-humidity environment including direct jet stream, it is preferable to winding selectively such as self-fusing tape between the second portion and the cap 30.

The airtightness test is performed under the following conditions against the locking device for optical drop cable 100 of the present embodiment. That is, the locking device for optical drop cable 100 is assembled in the manner described above, then, air is applied for 30 seconds at a pressure of about 0.15 MPa from the inside of the shaft portion 16. In this case, the presence or absence of air leakage from between the opening portion 36 and the second portion of the rubber sleeve 20 is confirmed. As a result, even when it is not wrapped around such as self-fusing tape between the second portion and the cap 30, the air leakage from between them does not be occurred.

The invention claimed is:

1. A locking device for optical drop cable comprising:
   a cable conductor of optical fiber;
   tension members sandwiching the cable conductor of optical fiber;
   a sheath having a notched part, and covering the cable conductor of optical fiber and the tension members;
   a rubber sleeve of a conical trapezoidal shape constituting a part of the conical as a entire outline, and being formed several through-holes corresponding to an outline of the sheath along a shaft center;
   a member positioning of the rubber sleeve, and having a step portion wherein its inside diameter is smaller than the diameter of the bottom surface of the rubber sleeve in a state where an optical drop cable is passed through the through-hole; and
   a cap having a tapered portion to grip the rubber sleeve, and being screwed to the member,
   wherein the cap is screwed to the member in a state where the rubber sleeve is inserted from its bottom to the member, together with sides of the rubber sleeve is squeezed toward the shaft center by the tapered portion, the rubber sleeve is pressed in its shaft direction, as a result, a sealing property between the rubber sleeve and the sheath is ensured by a outer edge of the bottom surface of the rubber sleeve and the step portion.

2. The locking device for optical drop cable as claimed in claim 1,
   wherein the through-hole is shaped approximately 8, in the case where the multiple through-holes are formed, they are formed by aligning the same direction to each other.

3. The locking device for optical drop cable as claimed in claim 1,
   wherein the rubber sleeve is the shape constituting a part of the conical, and
   the member comprises a slit portion surrounding the side surface of the rubber sleeve and grips the rubber sleeve by squeezing the slit portion toward the shaft center direction.

4. A rubber sleeve used for the locking device for optical drop cable described in claim 1,
   wherein the rubber sleeve has the conical trapezoidal shape constituting a part of the conical as a entire outline, in which several through-holes corresponding to an outline of the sheath are formed along a shaft center;

the rubber sleeve is configured to be gripped in a state where an optical drop cable is passed through the through-hole by the tapered portion in the locking device for optical drop cable; and when the cap is screwed to the member in the state where the rubber sleeve is inserted from the bottom to the member, together with sides of the rubber sleeve is squeezed toward the shaft center by the tapered portion, the rubber sleeve is pressed in its shaft direction, as a result, a sealing property between the rubber sleeve and the sheath is ensured by a outer edge of the bottom surface of the rubber sleeve and the step portion.

* * * * *